United States Patent [19]

Tylko

[11] 4,361,441
[45] Nov. 30, 1982

[54] TREATMENT OF MATTER IN LOW TEMPERATURE PLASMAS

[75] Inventor: Jozef K. Tylko, Stoneleigh, England

[73] Assignee: Plasma Holdings N.V., Curacao, Netherlands

[21] Appl. No.: 138,693

[22] Filed: Apr. 7, 1980

[30] Foreign Application Priority Data

Apr. 19, 1979 [GB] United Kingdom ............... 7913337

[51] Int. Cl.³ .................. H05B 11/00; C22B 4/00
[52] U.S. Cl. ................... 75/10 R; 219/121 P; 373/22
[58] Field of Search .................... 75/10–12; 13/9; 219/121 P

[56] References Cited

U.S. PATENT DOCUMENTS

| | | | |
|---|---|---|---|
| 3,429,691 | 2/1969 | McLaughlin | 75/10 R |
| 3,783,167 | 1/1974 | Tylko | 13/1 |
| 3,834,895 | 9/1974 | Cachat | 75/10 R |
| 3,843,351 | 10/1974 | Smith | 75/10 R |
| 3,852,061 | 12/1974 | Wulff | 75/10 R |
| 3,862,834 | 1/1975 | Waclawiczek | 75/10 R |
| 3,893,845 | 7/1975 | Mahaffey | 75/10 R |
| 3,936,586 | 2/1976 | Tylko | 13/9 |

FOREIGN PATENT DOCUMENTS

| | | | |
|---|---|---|---|
| 1390353 | 2/1972 | United Kingdom | 75/10 R |
| 1390351 | 4/1975 | United Kingdom | 75/10 R |
| 1390352 | 4/1975 | United Kingdom | 75/10 R |
| 1529526 | 10/1978 | United Kingdom | 75/10 R |

OTHER PUBLICATIONS

Hamblyn, "Plasma Technology and Its Application to Extractive Metallurgy", Minerals Sci. Engng., vol. 9, No. 3, pp. 151–176, (Jul. 1977).

Primary Examiner—P. D. Rosenberg
Attorney, Agent, or Firm—Schroeder, Siegfried, Vidas, Steffey & Arrett

[57] ABSTRACT

A plasma reactor, in which particulate matter is caused to interact with low temperature plasma (i.e. below 100,000 K.) comprises spaced stationary electrode structures 2, 11 of which at least one is annular, between which an arc or arcs 7 is established by a power supply which may include a thyristor (SCR) 9. The arc is pulsated and caused to orbit or circulate round the or each annular electrode structure to form a conical plasma zone between the electrodes, while particulate solids are introduced through inlets 5 to enter the plasma zone and interact with the plasma therein. Extended dwell periods and highly effective interaction are brought about by circulation and pulsation of the arc and a high particle population density. The arc can be circulated at high speed by electrical means, for example by sequential energization of plasma torches 1 in an annular array or of the segments 8 of a segmental anode, or by electromagnetic circulation of the arc attachment round an annular cathode or round a segmental anode with the help of coils 10 fitted between the segments. Examples of reactions that can be efficiently conducted by this method include the reduction of metal ores, beneficiation of low grade chromite ores, recovery of energy values from low grade carbonaceous matter such as colliery wastes and the formation of pozzolanic material and cements from siliceous minerals.

15 Claims, 10 Drawing Figures

TREATMENT OF MATTER IN LOW TEMPERATURE PLASMAS

BACKGROUND OF THE INVENTION (a) Field of the Invention

This invention relates to the treatment of particulate matter in regions affected by electric arc discharges, and in particular to the interaction of low temperature plasmas (i.e., below 100,000 K.) formed in such discharges with dense populations of particles entrained therein.

Plasma may be defined, in current terminology, as an assembly of electrically charged particles exhibiting collective behaviour. Such assemblies may be provided, for example, by a body of hot ionized gas in which the numbers of positive charges (ions) and negative charges (electrons) are usually, but not necessarily, substantially equal, resulting in overall electrical neutrality or 'quasi-neutrality'. The expression 'low temperature plasma' is here taken to refer arbitrarily to plasmas having an ion temperature below 100,000 K. The arc discharges employed herein are to be distinguished from glow discharges which occur at considerably reduced pressures. In the present invention the discharge will usually be conducted in a medium at or above substantially atmospheric pressure, although considerable local variations in pressure may be present, and indeed form a preferred feature of the invention.

(b) Description of the Prior Art

Low temperature plasmas have received considerable attention in the last decade as a possible alternative route to many industrial processes, such as the manufacture of steel and ferro-alloys, various syntheses and manufacture of pozzolanic materials, and hydraulic cements.

All the suggested methods, whatever their design or arrangement, have one thing in common: they all rely on the conversion of electric current into high temperature effluents of one kind or another which, by virtue of their high temperature and enthalpy, interact with the feedstocks, bringing about a higher rate of reaction than would take place at a low temperature. In this sense, all these methods may be locked upon as predominantly thermal and the reactions occurring take place between the high temperature gaseous (or partially ionised) phase and the solids. Increasing the temperature of the feedstocks to a level high enough to make them dissociate, although possible, is far too expensive in electrical energy to make such a method industrially attractive. On the other hand, most conventional methods of producing low temperature plasmas, for example, plasma torches ('plasmatrons') based on radially constricted arc discharges or RF torches, generate far too small volumes of plasma at far too high temperatures to make them industrially applicable.

Various attempts have been made in the past to introduce particulate materials into low temperature plasmas. For example, introduction of particles into the arc chamber of a plasma torch has been tried, but this causes serious problems. Among these is contamination of cathode, on the low work function of which the efficiency of electron emission depends, and frequent unacceptable erosion of the constricting channel of the torch, as well as accretions. Introduction of particles into the constricting channel itself, on the other hand, disturbs the plasma and seriously limits the quantity of particles that can be introduced. This mode of particle introduction is, however, practised in so-called 'plasma spraying', where the introduction of only relatively small amounts of particles is required.

There are also more general difficulties in the treatment of particles in plasma, of which the most important are:

1. Difficulties with the introduction and retention of particles in the plasma of the arc discharges. These are chiefly due to high viscosity gradients between the plasma and the surrounding gas and to thermophoretic phenomena which tend to reject such particles from the plasma zone.

2. Difficulties in maintaining arc discharges in the presence of particles which, when present in larger quantities, tend to extinguish such discharges chiefly by the development of various electron-scavenging mechanisms which capture the current-carrying electrons in the plasma.

3. Difficulties in providing the same treatment for all the particles entering the reaction zone, irrespectively of their size. Thus when larger particles may not yet be fully treated, smaller ones may already have partially or wholly evaporated, bringing about electron-scavenging and resulting in instability and collapse of the discharge.

4. Further difficulties occur with the choice of materials for the electrodes and the refractories of such devices. If, as is commonly done, direct current is employed, the cathode is frequently in the form of a non-consumable thoriated tungsten rod in a plasma torch working in the transferred mode. However, in such circumstances the anode to which the arc is transferred dissipates large quantities of expensively derived energy and consequently must be intensively cooled, which represents considerable energy losses. Similarly, the refractories containing the reaction zone are kept small in order to engage as many particles in the plasma as possible. As a result of this, frequent failures of refractories occur and, furthermore, the surfaces of many refractories, particularly when contaminated with fumed feedstocks, become electrically conducting and give rise to short circuits.

5. As such devices require particularly critical current and voltage control, when scaled up to even a few megawatts of power, their direct current supplies become very cumbersome and expensive, while the increased power in a plasma torch makes all the above listed difficulties more acute.

The above difficulties were well recognised by those skilled in the art and, as a result, the industrial applications of low temperature plasma technology followed, broadly speaking, two different routes.

The first route, in which the volume of the arc discharge was not used for entrainment of feedstocks, chiefly utilised the point of impingement of the arc at the anode and behaved in this respect very much like electric arc furnaces. Their main advantages are claimed to be the use of a non-consumable electrode (namely, a plasma torch) and the fact that the high kinetic energy of the plasma effluent causes stirring of the melt thereby distributing its temperature. A variety of such devices based on one or more plasma torches, or plasma torches operating in combination with orthodox electric arcs, are described in the literature and operate usually at a pilot plant level. In some of these devices, solid particles are introduced during the arc operation but their interaction with the latter is minimal.

The second route aims at the treatment of particles in the whole volume of the plasma produced. For this purpose it was required to expand the plasma, and this involves increasing its original volume with simultaneous reduction of its temperature and viscosity gradients. Two entirely different methods have been used for this purpose. The first of these was based on the fact that when an electric arc discharge is placed symmetrically in the centre of a hollow rotating cylinder it begins to expand radially outwards due to viscous drag forces, until at a certain angular speed it fills the whole of the cylinder. This principle was originally described by W. Weizel et al., in 'Theorie Elektrischer Lichtbogen und Funken', Barth, (Leipzig, 1949). A number of devices based on this principle were constructed, but there are serious limitations to this method. These are chiefly due to the rapid rotation of a large cylindrical body which such a furnace requires, and the fact that only when the plasma is fully expanded does it become stable. However, when this takes place, the plasma is in contact with the inner rotating refractory walls and tends to destroy the latter. Chiefly for these reasons, this technique found only limited applications and did not prove itself capable of treating large quantities of plasma-entrained particles.

The second method of expanding low temperature plasma arc discharge was discovered by the present inventor in 1971 and disclosed in British Patent Nos. 1,390,351-3. In this method a plasma torch acting as a cathode was made to orbit in a circular path and at a small angle with the vertical, projecting the arc to a downstream annular anode. In this way a truncated conical region was defined by the orbiting arc discharge. This method, which was in turn derived from previous work of the same inventor on planar expansion of plasma jets as described in British Patent No. 1,201,911, aimed at the formation of a large volume of plasma in which solid particles could be treated. This method, which became known as Expanded Precessive Plasma (E.P.P.'), showed certain advantages over the previous method when practised intermittently and on a small scale, of approximately 1 to 2 MW, and served well as a laboratory plasma furnace for studying many reactions. However, its main disadvantage proved to be the limited orbiting speed of the plasma torch and the need for frequent replacement of the consumable anode. During its eight years of development, various methods of oribiting the torch were tried but in view of the large out-of-balance inertia forces which inevitably develop in an inclined plasma torch, the maximum angular speed reached was 2000 rpm, while a safe operational speed was considered to be 1500 rpm. These low speeds were chiefly responsible for the very limited expansion of the primary plasma jet, as was confirmed by photography. As a result of this there was only a limited and often sporadic interception of the falling particles by the plasma jet, and the method was limited to the injection of relatively small amounts and not uniformly dispersed feedstocks.

The lack of suitable control to provide for uniform exposure of the falling solids to the plasma was the main limitation of this technique. As mentioned above, mere increase in the power of the primary plasma jet reduces interception and increases the rate of rejection of the particles. These phenomena were further confirmed in more recent work of the same inventor, described in British patent applications Nos. 45839/76 and 28881/77, in which the EPP technique was used for making pozzolanic materials from colliery spoils. In that case, the lack of uniformity in the products further confirmed this limitation. However, when used in melting, that is, transferring the primary plasma jet to an electrically conducting melt, the EPP method behaved similarly to the methods of the first group of devices, as mentioned above.

It is also thought that scaling-up of EPP installations to full industrial requirements may prove difficult. While large plasma torches are available, making them orbit at high angular velocities is more difficult. Such torches are also likely to cause serious ablations when their arcs are transferred to the anodes. Finally, it should also be said that while EPP installations require complex controls in order to maintain their arcs, there are no means for adequately controlling the processes responsible for the entrainment and treatment of the particles themselves. Consequently, the efficiency of these processes is not as high as it might have been if a larger portion of the energy of the plasma effluents could have been utilised.

SUMMARY OF THE INVENTION

Now, according to this invention there is provided a method of treating particulate matter with low temperature plasma, which comprises: producing an electrical arc discharge between spaced stationary electrode structures; causing rapid changes in the power and in the distribution of the discharge about the peripheries of the respective electrode structures to produce a region of plasma in the interelectrode space; and introducing entrained particulate matter into the plasma region thus created.

Further in accordance with this invention there is provided apparatus for treating particulate matter with low temperature plasma, comprising: a pair of stationary electrode structures, at least one of which is annular, spaced apart to provide a reaction zone therebetween, means for introducing particulate matter into the reaction zone, a power supply for applying a rapidly fluctuating potential difference between the electrode structures capable of establishing and maintaining a discharge, and means for causing rapid circulation of the disposition of the discharge about the peripheries of the or each annular electrode, whereby expanded plasma is maintained in the reaction zone.

It was in view of the limitations of the prior art discussed above that more fundamental work was undertaken by the inventor hereof, which led to the present invention. The latter arose from two recent observations of the inventor's. Firstly, it was noted that when the interelectrode space, between which an orbiting arc discharge was established, was substantially filled with the entrained particles, the primary arc discharge was forced to accept a tortuous path between the solid particles, often branching into channels and deviating from the shortest path taken in the absence of such particles. This phenomenon was only observed when there was a substantial amount of the particles entrained in the interelectrode space. As a result, the effective energy flux through the cone defined by the orbiting arc is increased, since the energy flux $\phi$, at a cross-section of the cone having diameter 2r, is given by the equation:

$$\phi_1 = \frac{\text{Energy}}{\text{Free cross-sectional area}} = \frac{E}{\pi r^2}$$

whereas, when the cone contains large amounts of entrained particles, the effective energy flux becomes $$\phi_2 = \frac{E}{\pi\, r^2 - \text{(cross-sectional area of particles)}}$$

and hence $\phi_2 > \phi_1$. It is therefore the presence of a dense suspension of particles in the plasma cone which increases the effective energy flux and causes rapid plasma—solid interactions. These interactions need not be purely thermal; indeed, as will be shown below, there is evidence that various other mechanisms are at work. However, as is well known, under such conditions of dense particle population, the stability of the arc is greatly impaired, leading to frequent extinction. This invariably takes place when the usually carefully smoothed d.c. power sources are used. It is for these reasons that only relatively small quantities of particles could be hitherto introduced into such arcs. However, it was found that if the particles were charged prior to their introduction into the interelectrode space or, alternatively, if ionization was maintained in this space by alternative means, as hereinafter described, even relatively low voltages were sufficient to maintain the discharge.

The second observation made by the inventor hereof was the apparently anomalous behaviour of certain solids in such plasmas. For instance, it was discovered inter alia that when particles comprising iron oxides and coal fines of some 300-500 microns average diameter are passed through a region of unstable electric arc discharges, contrary to general expectations, small spherules, for example of 5-10 microns diameter, of very pure semi-steel were formed within such particles. Normally, a purely thermal action is assumed to take place in the reduction of mixtures of iron oxide and coal. Thus the reduction proceeds chiefly through the formation of carbon monoxide, which in turn reduces the iron oxides in well-defined stages. Starting with haematite, this should lead to magnetite, thence to wuestite and ultimately to metallic iron in which a certain amount of carbon is dissolved. Such diffusion controlled reactions should proceed from outside inwards, and indeed there is ample evidence to this effect. However, in the case in question, the particles were residing in the interelectrode space for less than 200 ms and the actual time when they were intercepted by the arc was only a small fraction of this time. It is also known that, although thermodynamically possible, the reaction between solid carbon and iron oxides is very sluggish even at elevated temperatures, so that this alternative explanation was also unacceptable. Other anomalies were also observed to occur sporadically with different materials subjected to such treatment. For instance the treatment of colliery spoils revealed occasional total separation of the carbon content from the spoil matrix. Generally these anomalous phenomena occurred in unstable plasmas and were either ignored or considered too unpredictable to be worth further investigation. This was, for example, the case when iron ores were treated in the E.P.P. type of apparatus referred to above in connection with British Pat. No. 1,390,351. Yet it is the method and apparatus for the utilisation of these non-thermal phenomena in the microscopic behaviour of such plasmas that form an important part of the present invention.

BRIEF DESCRIPTION OF THE DRAWINGS

Similar reference numerals represent similar items in the various Figures.

DETAILED DESCRIPTION OF THE INVENTION

Figure 1:
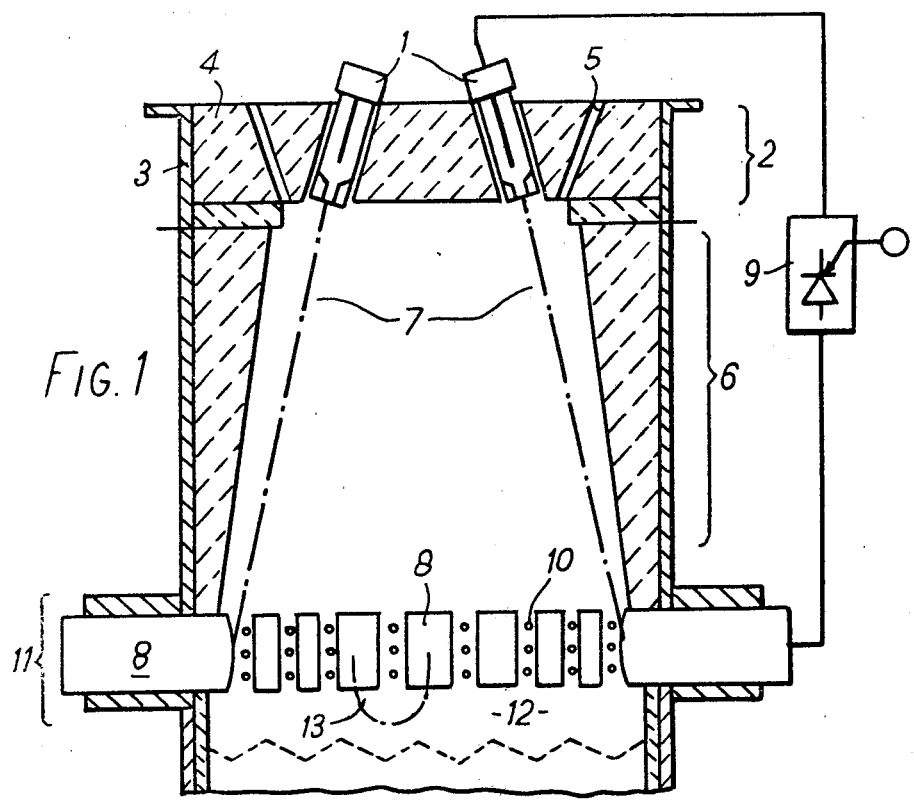
FIG. 1 is a schematic vertical section of a plasma reactor embodying the invention, in which the cathode structure comprises a plurality of plasma torches.

The present invention provides a method and apparatus whereby relatively large quantities of particles can be entrained in the plasma zone of an orbiting or circulating arc reactor, without extinguishing the arc, while uniformity of treatment and the necessary time of contact are achieved by characteristic control of the discharge conditions.

Among the practical factors investigated by the present inventor and found to be important in providing plasmas in which large quantities of particles can be successfully entrained and uniformly treated, the following are believed to be the most significant:

(a) Orbiting of the arc by non-mechanical means, whereby rapid rates of rotation far greater than those possible by mechanical means can be attained.

(b) Pulsation of the arc by rapid changes in the applied power, thereby producing acoustic shockwaves or discontinuities in the plasma, and resulting in local disturbances of the quasineutrality and thermal equilibrium of the plasma.

The rate of oribiting or circulation of the arc should be sufficient, in combination with the effects of pulsation and of the introduced particles, to give the particle residence time required for the desired reaction. In some cases, circulation rates as low as 1000 r.p.m. can be employed, but usually the rate will exceed those discussed in connection with the E.P.P. reactors referred to above, notably 3-500 r.p.m. in British Pat. No. 1,390,351 and 4000 r.p.m. in British Pat. No. 1,529,526. The preferred rates range from these values up to 60000 r.p.m. or even higher.

The following chain of events may be postulated, although the utility of the invention is in no way dependent upon the accuracy of this theory:

(1) The power supply to the plasma is rapidly increased, causing a widening of the arc channel and a rapid increase in the gas temperature of the surrounding atmosphere. This expands or rarefies the gas in the immediate vicinity and drives ahead of it a compression front.

(2) The power supply to the plasma is then rapidly decreased, causing a narrowing of the arc channel and decreasing the temperature of the surrounding atmosphere. This action stops the expansion and attenuates somewhat the acoustic wave created at (1) above.

(3) The orbiting plasma arc enters the region through which acoustic waves are being propagated and is substantially affected by such waves. Thus, where the plasma travels through a compression region it rapidly approaches equilibrium between its ion and its electron temperatures ($T_i \fallingdotseq T_e$) but where it enters a rarefaction region, a non-equilibrated plasma results ($T_e > T_i$). The presence of the entrained particles considerably modifies this picture, by introducing new and intensifying the already present strong discontinuities, that is to say, shockwaves.

Moreover, these strong discontinuities in the plasma enhance the formation of 'microfields' in which very high local potential differences and other associated fluctuating anomalies occur. These local high potential differences and associated anomalies appear to have a pronounced effect on the entrained particles, such as the imposition of electrical and mechanical stresses, assisting disruption and causing polarization, increased ionisation, and interaction with solid state defects. Effects of this character, which are essentially non-thermal and reside in the microscopic mechanisms of plasmas, although previously observed (cf. D. A. Frank-Kamenetskii: Lectures in Plasma Physics; Pub. Atomizdat, Moscow, 1964) have hitherto not been employed in the treatment of solids in plasmas.

While the above model is highly simplified, it does suggest the basic mechanism by which the present invention overcomes the major difficulty of achieving a high rate of transfer of energy from a surrounding medium to a body immersed therein. In statistical terms, the mechanism provides rapid re-establishment of high diffusion gradients.

Since the electrode structrues are stationary, in the sense that they are not rotated to spin the arc (although they may be movable in the axial or radial directions for various purposes, as described hereinafter), orbiting of the arc must be achieved by non-mechanical or essentially electronic and/or electro-magnetic means. In one form of apparatus according to the invention, especially for lower power reactors of, say up to 6 MW, the cathode is a single annular electrode disposed coaxially in the reactor. The primary arc discharge is then caused to circulate round the cathode electromagnetically by means of one or more coils provided in the cathode structure. Characteristically, in all aspects of the invention the arc itself is not rotated (as is the case when electromagnetic means are arranged to act at the interelectrode gap) but rather the points of attachment of the arc at the cathode and anode are made to move. In another form of apparatus, especially useful where power is to exceed 6 MW, the cathode structure comprises an annular array of spaced plasma torches, which are energized sequentially to secure effective orbiting of the primary arc. This sequential energization does not necessitate extinction of the arc at each torch but merely a reduction in power.

The anode structure will usually also be annular, but the use of a segmental anode is especially preferred. This both enables the segments to be advanced radially inwards to compensate for loss of anode material in use, and also facilitates circulation of the primary arc about the anode structure by electrical means. Because of the obstruction presented by the solid particles, the arc has much less energy when it reaches the anode and it is therefore easy to circulate at the anode. One way of achieving this is to connect each anode segment to a separate thyristor (rectifier—SCR). These thyristors are then activated in sequence, to cause circulation of the arc in any desired manner. A second way of circulating the arc at the anode is to use a variable frequency polyphase generator to energize electromagnet coils fitted between the anode segments and connected in pairs of opposite coils, each pair being connected to one phase.

An outstanding advantage of controlled circulation of the arc at the anode is the facility it affords for providing a lead or lag between the cathode and anode points of attachment of the primary arc discharge. This enables the primary discharge to be constrained to follow a non-linear path, so extending the path and hence the residence time, of particles carried in the plasma.

The effective buoyancy of particles descending through the orbiting and pulsating region of plasma, and hence their time of residence, is a function of the following main factors:

(i) the horizontal component of the orbiting motion of the arc which extends the path of descent and thereby permits greater interaction with various drag forces. The ability to advance or retard the arc circulation independently at either electrode, as well as the ability to change the geometry of the cone configuration, plays here an important rôle;

(ii) the resistive drag of the particles strongly augmented by the effect of the pulsating shockwaves, creating highly tortuous paths;

(iii) the horizontal component of the channelling of the arc due to the particle population, and the resulting interparticle collisions;

(iv) the electrostatic and electromagnetic interactions on the surfaces of and within the particles, as well as rapid outgassing (in the early part of the descent), which frequently lead to disintegration of the particles.

The provision of the second of the above factors and the ability to orbit and manipulate the motion of the arc within very wide limits, contributed by the first factor, are unique to the present invention and provide for a high degree of uniformity in the treatment of feedstocks.

Although the broad principles of the present invention are applicable to alternating current arc discharges in practice direct current arcs are preferred, although for the purposes of arc pulsation or circulation a fluctuating or alternating component may be superimposed on the basic d.c. An a.c. arc is extinguished twice in every cycle and much of the cycle is not usefully employed. Moreover, an a.c. arc tends to be self-rectifying. Furthermore, in a d.c. arc approximately two-thirds of the energy lost to the electrodes is dissipated at the anode and only one-third at the cathode, so that thermal loading of the cathode is more readily avoided. Moreover, a glancing d.c. arc at the anode transfers most of its energy to anode streamers, which in a reactor with an annular anode provide a useful tail flame. Such streamers can be further increased in intensity and usefulness by the use of a segmental anode as described hereinafter.

Thus the preferred power supply to the plasma for the purposes of this invention is an unsmoothed d.c., that is to say d.c. modified by provide for the rapid pulsations that form a feature of the invention. An unsmoothed d.c. supply comprising portions of a sinusoidal wave form, such as can be obtained by 'firing angle control' of thyristor (SCR) types of rectifier, are particularly suited for this purpose. The fluctuations in the supply preferably have a frequency in the range from 50 cycles to 1 kHz. The plasma requires a continuous supply of electrons to preserve it from decay, but this is assisted by rapid circulation of the arc. Because the vectors of diffusion outwardly from the arc are divergent, while those inwardly are convergent, charged species tend to collect inside the cone defined by the circulating arc. Above a critical velocity, the arc returns to a previous position before all the electrons have dissipated, giving an 'avalanche' phenomenon and a multiplication of charge. Moreover, oscillation of the plasma brought about by pulsation of the arc also assists in maintenance of the plasma. The acoustic shockwaves produced by the pulsations are reflected from the walls of the reactor and repeatedly interact with the plasma in the manner already described.

Because of the controllable buoyancy afforded by the present invention, a wide range of particle sizes can be successfully treated in reactors in accordance with the invention and a wide range of residence times attained.

The preferred particle size range is from 100 to 500 microns diameter, but particles as fine as 1-10 microns and as coarse as 3000 microns have been satisfactorily handled.

Residence time can be controlled at values of from ca. 10 ms. up to about 1 second by appropriate adjustment of spinning rate, anode lead or lag, and pulsation frequency. Some reactions require only a few milliseconds for completion while others, notably glass formation, may require times of $\frac{1}{2}$ or $\frac{3}{4}$ second.

Various different forms of reactor can be constructed, all of which rely on the principles of this invention but which are more especially suited for carrying out particular types of reaction.

DESCRIPTION OF THE PREFERRED EMBODIMENTS

According to a first preferred aspect of the invention, a reactor for entraining and treating dense populations of particles in low temperature plasmas comprises an upstream cathode assembly, which may conveniently comprise a plurality of circumferentially spaced constricted arc plasma torches (working in the transferred mode), a downstream annular anode assembly, preferably comprising a plurality of radially extending anode segments, means for supplying a plasma-forming gas to the cathode assembly, a power source for the reactor, preferably comprising partly or fully controllable solid state rectifiers, means for independent control of the power delivered to each of the cathodes in a controllable prearranged sequence, means for establishing primary plasma jets between each of the cathodes and anodes of the respective assemblies in such a manner as to cause a rapid train of varying power in such discharges to be propagated along the generatrix of a truncated cone between the cathode and anode assemblies, with controlled lead or lag displacement between respective electrodes in all cooperating pairs, means for introducing particulate material in the proximity of the cathode assembly and means for further treating or withdrawing the products of the reactor. The reactor may conveniently include means for treating the particulate material prior to its entry into the plasma region, and the means for further treatment may comprise means for quenching the plasma-treated particles to arrest their reaction. Where a segmental anode is used, a single stationary plasma torch can suffice as cathode.

With the above arrangement, trains of alternating high and low power plasma jets may be established at high frequencies up to 1 kHz or higher by using various types of firing technique such as are currently available in solid state controlled power switching and rectifying devices. The advantage of this arrangement, which may be further assisted by providing electromagnetic means for displacing the anode termination of the plasma arc from one anode segment to the next, lies chiefly in the absence of any mechanically moving parts, while at the same time providing for reliable and easily controllable commutation of the arc. It creates within the conically shaped reaction space waves of rapidly decaying thermally non-equilibrated plasmas and local field oscillations or microfields, which in turn cause the development of highly advantageous thermal and non-thermal phenomena in the entrained particles, as mentioned hereinbefore. While the detailed mechanisms of these phenomena are not yet fully understood, some of their features have been elucidated and may be mentioned by way of explanation. Many substances, and especially those comprising crystalline bodies of non-stoichiometric type, when entrained in such plasmas exhibit "action from within" as if they were diaphanous to the ambient plasma and it may be postulated that non-thermal plasmas are formed within the microscopic pores of the feedstock particles as a result of spontaneous polarisation. The phenomenon may apply to a wide range of crystalline lattices with various defects, such as are invariably present in minerals. Thus while this type of plasma forms within the pores of a particle almost instantaneously, and before the particle heats up in the ambient plasma, it is retained for a considerably longer time before it diffuses to the outer surface, as a result of outgassing, and reacts with the ambient plasma. Alternatively, other types of crystalline substance may, upon entrainment in plasma, develop instantaneously, its own specific plasma in its intercrystalline pores by virtue of spontaneous polarization. It is therefore probable that it is this internal plasma which on the one hand is responsible for the ultra-fast reactions in the presence of ionised species, as in the case of iron oxides, or the equally fast total separation of carbon values from colliery spoils, and on the other hand permits the maintenance of the discharge in the presence of the dense particle population by introducing additional plasma into the system.

Where this phenomenon does not appear, or appears only to a minor extent, the method of the present invention can rely on electrostatic charging of the particles prior to their entry into the plasma zone of the reactor, in order to reduce the effective electron scavenging and maintain the discharge. In either of the aboce cases the invention employs dense populations of plasma entrained particles for the purpose of constricting the plasma channelling through it. This behaviour may be compared with the constriction of the primary arc in the plasma torch and likewise affords a certain measure of dynamic stabilisation. Under the above conditions the plasma entrained particles undergo frequently violent outgassing in which microscopic shockwaves are produced. These are imposed upon the local turbulence and the overall spiralling motion of the particles and ambient plasma. Interaction of these phenomena provides for the characteristic uniform treatment of the feedstock while the degree of pulsation of each primary jet and the slope of the spiral produced by the controlled lag or lead between cathodes and anodes determines the time of residence of the particles in the reaction zone.

The aspect of the invention just described lends itself particularly well to scaling up for large industrial installations where, instead of concentration of the whole plasma power within a few plasma torches, a conveniently distributed larger number of plasma torches may be used, thus relieving considerably the design constraints with which alternative methods of treating particles in expanded plasmas must contend. Where a number of plasma torches is used, these may conveniently be arranged in an equally spaced mode along one or more concentric circumferences or in other, preferably symmetrical, configurations. Such solutions of the cathode design problem permit convenient introduction of particulare feedstocks through ports between the plasma torches or along circumferences between those on which the torches are spaced. However, there also arise frequently situations where preliminary evaluation of treating small quantities of a mineral sample is required, and for such and similar purposes another embodiment of the present invention may be practised.

According to this second preferred aspect of the invention the upstream cathode of the plasma reactor comprises an annular or hollow cylindrical non-consumable electrode sharpened to an edge at the electron emitting end. This cathode is mounted in a circumferentially constricting arc chamber defining an outwardly inclined annular passage. The centre of the hollow cathode carries electrically insulated means for electromagnetic orbiting of the arc, which may conveniently comprise a toroidal electromagnet capable of producing varying field strength, and transferring the point of attachment of the arc along the rim of the cathode. This type of hollow plasma torch arrangement is supplied, like the plasma torches of the previous embodiment, with plasma forming gases. This type of cathode projects a primary arc towards an anode assembly substantially of the same type as in the first embodiment of the invention. Alternatively it may be provided with a series of pulsating field electromagnets placed between the segments of the anode in order to achieve independent controlled circulation at the anode and cause the already mentioned and highly advantageous spiralling effect. It may thus be termed a 'gliding cathode'. In view of the large working surface of this type of gliding arc cathode, the cathode coolant requirements are low and easily fulfilled.

Some specific embodiments of the invention will now be described by way of example, with reference to the accompanying drawings.

FIG. 1 illustrates one form of multi-torch plasma reactor according to the invention. In this reactor, plasma torches 1, with the necessary gas, current and coolant connections, are mounted at an angle inclined to the vertical and are equally spaced and circumferentially disposed in a plasma source head 2. A modular construction is adopted, facilitating the removal of the whole head section 2 with its shell 3 and refractories 4. The head 2 may also include on the same circumference as the plasma torches 1, insulated channels for the injection of feedstocks, which are not shown in the crosssection adopted, and other feedstock channels 5 may be provided on other circumferences. These channels extend upwards past electrostatic charging probes (not shown) to dispensers for the feedstock (also not shown). Immediately below the head section 3 is a reaction chamber 6. The broken lines 7 indicate the direction of primary plasma jets emanating from the plasma torches towards the mid point of respective anode elements 8. The plasma torches 1 and corresponding anode elements 8 are connected to a controllable power supply, such as a solid state rectifier, 9, only one of which is shown, for clarity. Coils 10, delivering pulses for advancing or delaying the anode root attachment of the primary plasma jet, are shown located between the anode elements 8, their power source and cooling means for the whole anode assembly 11 being omitted for reasons of clarity. Below the modular anode section 10 there extends a short "tail flame" section 12 which is formed by numerous anode loops, one of which 13 is shown. According to the intended use of the reactor there may follow various further modular sections, such as those shown in FIGS. 3 and 4. If the reactor shown in FIG. 1 is intended to produce molten metal and slag, then a second or bottom anode may be provided, as at 41 in FIG. 4, the anode section 10 being kept at a lower potential than the bottom anode. Alternatively, where simple melting or alloying is required, the anode section 10 is removed and the cone of spinning and pulsating plasma is made to impinge directly on the molten pool.

Figure 2A:
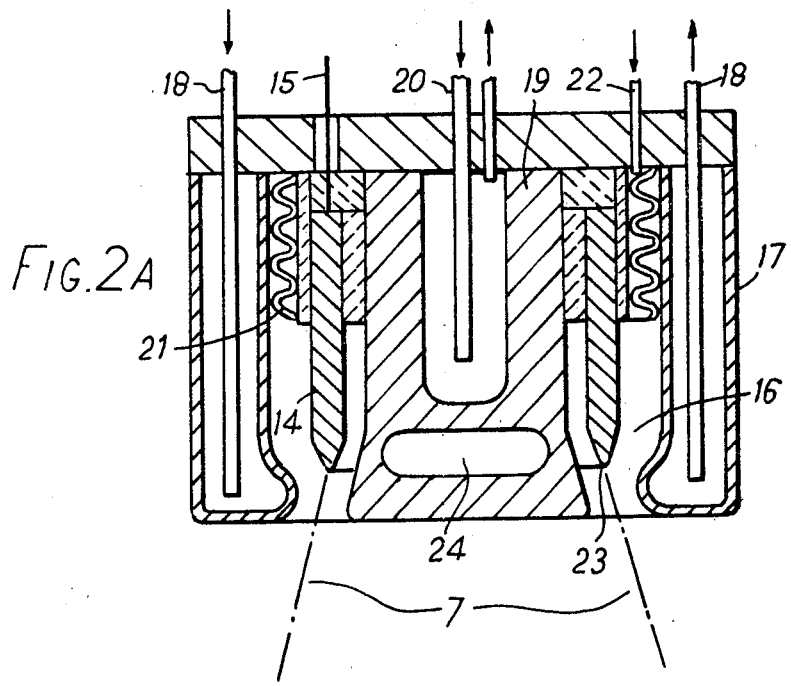
FIGS. 2A, 2B and 2C are schematic sections of those forms of annular cathode structure for use in an alternative form of reactor embodying the invention.

FIG. 2A illustrates a form of gliding cathode arrangement for a low power reactor according to the invention. The hollow non-consumable cathode 14 with current lead 15 is mounted centrally in a plasma forming chamber 16, defined by a water-cooled outer member 17 with coolant tubes 18, and an inner member 19 likewise cooled by water introduced through a central tube 20. Both these members are insulated from the cathode 14, and an annular insulator 21 also provides a swirling channel for the plasma-forming gas introduced through a tube 22. The cathode spot attachment 23 of the arc is made to circulate in response to a rotating field produced by a coil 24 fitted inside the inner member 18.

The coil 23 preferably has a transformer steel laminated core to improve the field strength of the rotating field.

Figure 2B:
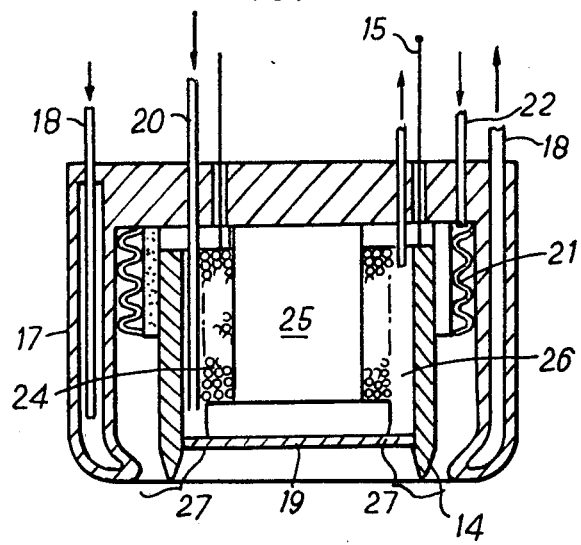

In an alternative structure shown in FIG. 2B, the rim of the 'gliding' cathode is mounted within the gap of an electromagnet. An internal electromagnet coil 24 on a core 25, fitted inside the hollow cathode body 14 and surrounded by a coolant space, 26, forms a field in which the magnetic lines of force are concentrated in the annular gap 27, into which the tip 28 of the cathode penetrates. This arrangement provides very efficient arc circulation at the rim of the cathode with a very low power consumption by the electromagnet.

Figure 2C:
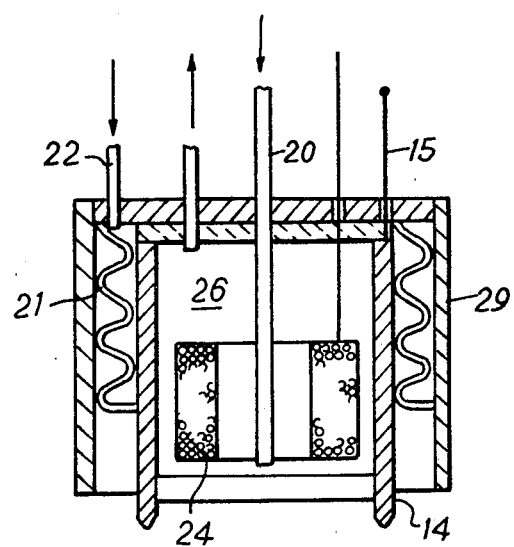

In FIG. 2C is shown a gliding cathode structure simply constructed with a coil 24 for rotating the arc again fitted inside the water-cooled body of the cathode 14. The ceramic insulating swirl 21 imparts rotation to the gas stream flowing between the cathode and the outer shield 29. This simple arrangement provides only weak arc constriction derived solely from the drag by virtue of the circulation of the arc around the rim of the cathode.

Figure 3:
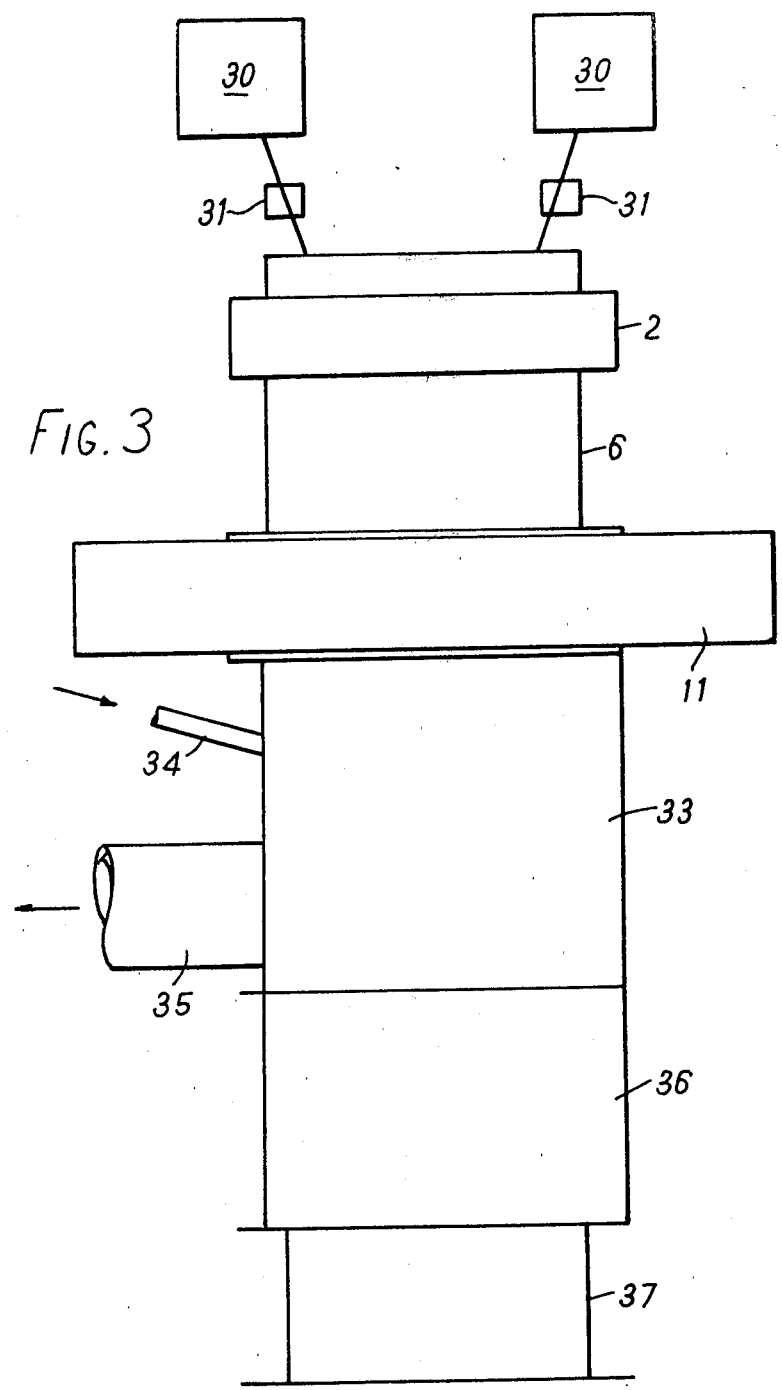
FIG. 3 is a schematic elevation of a reactor according to the invention intended for energy recovery, cement manufacture or ore reduction.

FIG. 3 shows diagrammatically a reactor according to the invention suitable for energy recovery from carbonaceous wastes. This aspect of the present invention applies to many industrial applications in which the treatment of feedstocks can be achieved 'in flight' through the reactor. Such applications include inter alia: partial, selective or complete reduction of metal oxides; recovery of copious quantities of energy from a variety of carbonaceous wastes, for example colliery spoils; and carrying out various reactions, especially endothermic syntheses such as that of acetylene, in which the products require rapid quenching and removal from the reaction zone. In the type of reactor represented in FIG. 3, feedstock dispensers 30 are connected through electrostatic charging probes 31 to the modular plasma head 2 to which the plasma forming gas, coolant and electrical supply to the cathodes of the plasma torches are also supplied. Downstream of plasma head 2 is the reaction chamber 6 and the anode assembly section 11. If, for example, the reactor is to be used for the recovery of energy from colliery spoils, a combustion chamber 33 is provided immediately below the anode section 11, to which controlled quantities of air are injected at 34 to cause combustion of the carbon values separated from the colliery spoil in the reactor 6. A side duct 35 carries the resulting hot gases away for steam raising and electricity generation, while the solid residues, which acquire highly pozzolanic properties and may be activated to form a wide range of hydraulic cements, pass through a cooling chamber 36 into a collector 37. In this particular example small quantities of semisteel are formed from the iron contents of the spoil and these may be simultaneously recovered from the cooled powdery product by electromagnetic separation. A similar procedure may be adopted when treating low grade oil shales.

Basically the same type of entrained particle plasma reactor may also be used for manufacture of a wide range of pozzolanas and hydraulic cements, when suitable cooling means are provided. Similar reactor design may also be used for direct reduction of iron ores and concentrates, without the need for pelletisation. In this case it is possible either to produce fine metallised granules or, alternatively, by providing below the multi-element anode assembly 11 a molten metal and slag collector and tapping these two products at their respective levels, to produce liquid semi-steel. In yet another variant it is possible to produce highly active reducing gas from cheap and plentiful carbonaceous wastes such as colliery spoil in one plasma reactor according to the invention and use it for direct reduction in most existing installations or, where pelletization is to be avoided, in another plasma reactor of this invention.

Figure 4:
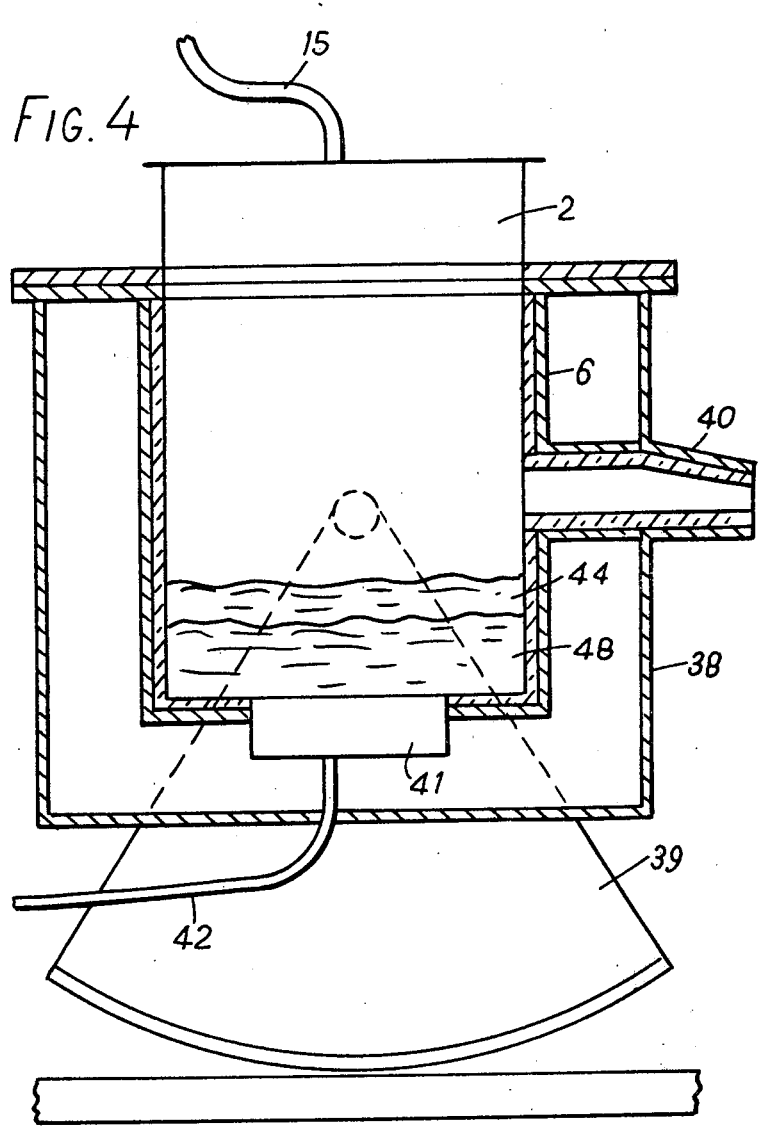
FIG. 4 is a schematic section of a further reactor according to the invention intended for steel or alloy production.

FIG. 4 represents schematically a tiltable reactor particularly suited for batch production of semi-steel or ferro-alloys, recovery of metal from steel dust and similar metallurgical operations. In this variant of the invention, a shell 38 containing the reactor 6 is suspended in a quadrant 39, which is tilted by means of hydraulic rams for emptying its contents through a spout 40. In this case, the plasma jets originating from the plasma head 2, with current connections 15, are projected towards a bottom graphite electrode 41, with connections 42, over which accumulates molten metal 43 and a layer of slag 44.

Where the invention is applied to the melting of materials in the bottom of the reactor, the entrained particle content of the plasma is supplied by necessary additives, such as carburizing, alloying or fluxing constituents.

Figure 5:
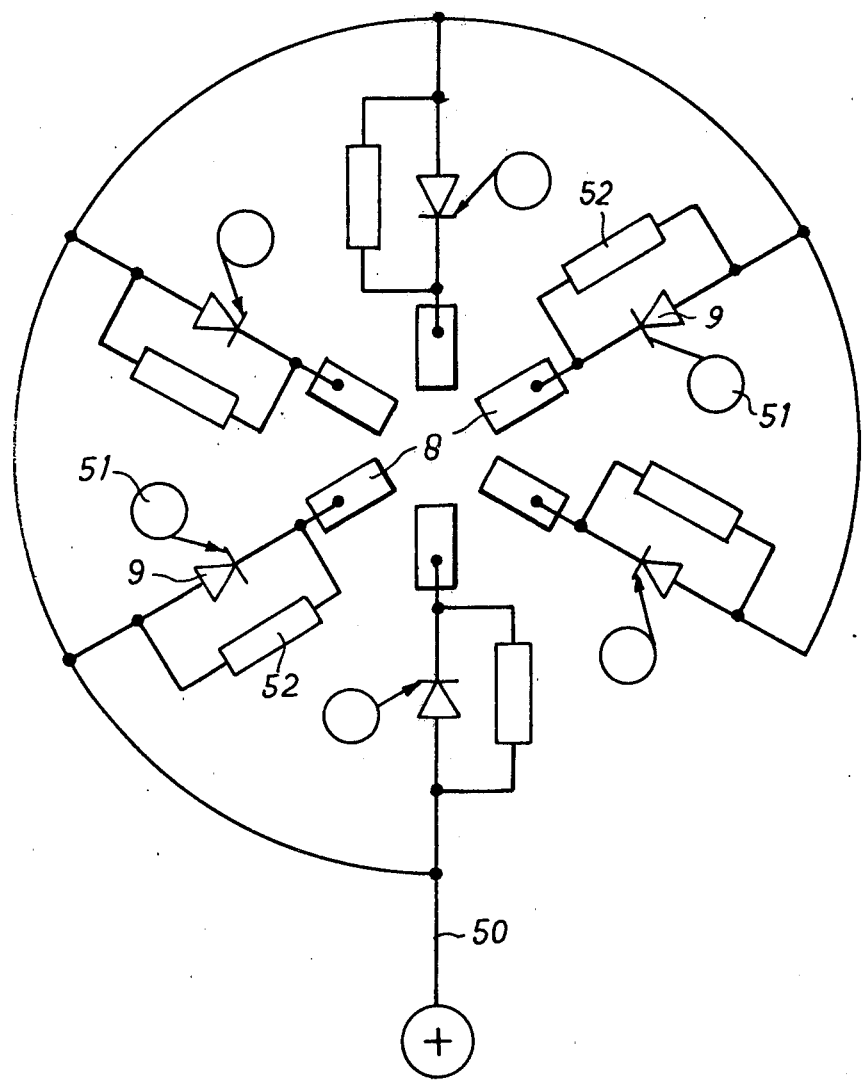
FIG. 5 is a schematic diagram illustrating sequential energization of segmental electrodes.
Figure 6:
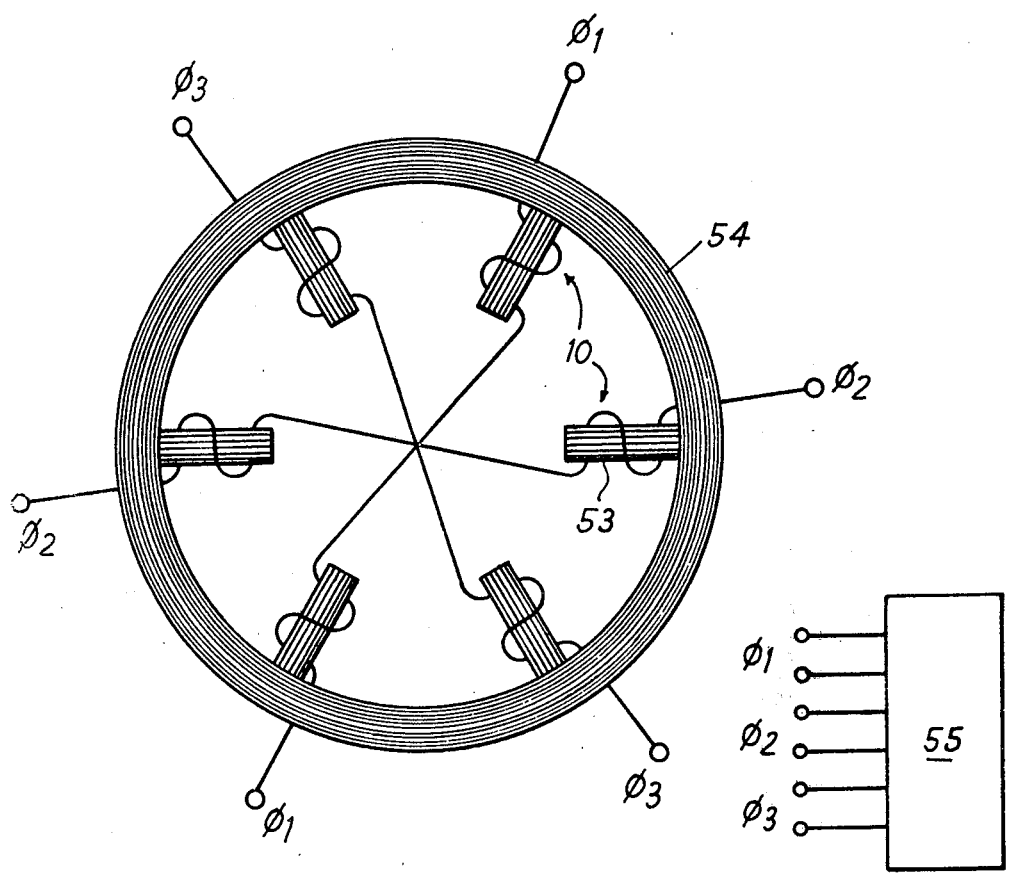
FIG. 6 is a schematic diagram illustrating the sequential transfer of the anode attachment of the arc by electromagnetic means.

The preferred means for controlling the energization of a segmented anode (as shown in FIG. 1), to achieve controlled circulation of the discharge at the anode, are illustrated by FIGS. 5 and 6.

FIG. 5 represents diagrammatically electrical/electronic means of orbiting the anode arc attachment sequentially at the segments of the anode assembly. Each segment of the anode receives in turn a supply of current, causing the arc attachment at the anode segments to orbit. It is also possible, where the stability of the arc so dictates, to maintain a group of neighbouring segments energized. Furthermore, in a large installation of this type where a number of plasma torches is used it is also possible to orbit a number of arcs in the above manner. A convenient way to achieve this type of orbiting is shown in FIG. 5, where (for six anode segments 8) six SCR devices 9 are connected on their anode terminal side to a common anode terminal 50 of the plasma power supply, and on their cathode terminal side each to the respective anode segment 8. The gate terminal of each SCR is connected to a firing circuit 51, and a forced commutation circuit 52 is connected across the anode and cathode of each SCR. In operation, the sequential firing of each SCR 9 is accomplished by applying a small pulse of suitable strength and duration to the gate terminal, causing the device to become conductive. This function is carried out by the firing circuit 51. The switching off of each conducting SCR is achieved on the other hand by forced commutation methods, for example Class C forced commutation, provided by the forced commutation circuit 52.

Notwithstanding the electrical/electronic control of the orbiting arc attachment as described above (FIG. 5), the invention also provides an alternative electromagnetic orbiting system based on controlled circumferential displacement of the anode arc attachment. This aspect of the invention is shown in FIG. 6. As assembly of electromagnet coils is positioned symmetrically in the plane of the anode or slightly above it, the segments of the anode (not shown for clarity) occupying the spaces between the coils. Six radially disposed coils 10 (where the number of anode segments is six), each on a laminated core 53, are built into a laminated outer core ring 54. Opposite coils are connected in series, and they are wound so that their fields are additive. Each pair of coils is connected to one phase $\phi_1$, $\phi_2$ etc. of a variable frequency polyphase supply (VFPS) 55, operating preferably in the frequency range of 100 Hz to 5 kHz. A three phase supply is shown in the Figure, corresponding to six anode segments. When such a supply is connected in the above manner it will produce three major components to the magnetic field in the plane of the Figure. As the polarity of the supply changes, the resultant of these fields will appear to rotate. Thus, an arc struck between the cathode (e.g. a plasma torch) and an anode segment will experience a force due to this field. Consequently, the arc will traverse the anode assembly, moving its point of attachment circumferentially from segment to segment. By varying the frequency of the VFPS supplies, the orbiting speed of the anode arc attachment may be controlled very precisely.

The above feature of the invention offers considerable advantages over other means of rotating the arc, such as the use of a coil surrounding the arc. Firstly, the amount of energy required to orbit an arc attachment according to the invention requires only a very small amount of energy and, secondly the orbiting arc is always positively locked to the frequency, orbiting in a dynamically stable equilibrium.

The above method of orbiting the arc may also be applied to gliding cathodes (such as shown in FIGS. 2A, B and C). In such a case, the outer laminated ring 54 is replaced by an inner laminated core with the coils 10, on their cores 53, pointing outwards toward the gliding rim of the cathode 14.

It is also possible to use different power supplies with this aspect of the invention. Thus, instead of a VFPS, a thyristor power supply digitally controlled to energize the coils in any predetermined sequence may be used. Such an arrangement is particularly applicable to large installations where a number of arcs emanating from separate plasma torches (cf. FIG. 1) can be accurately circulated.

Figure 7:
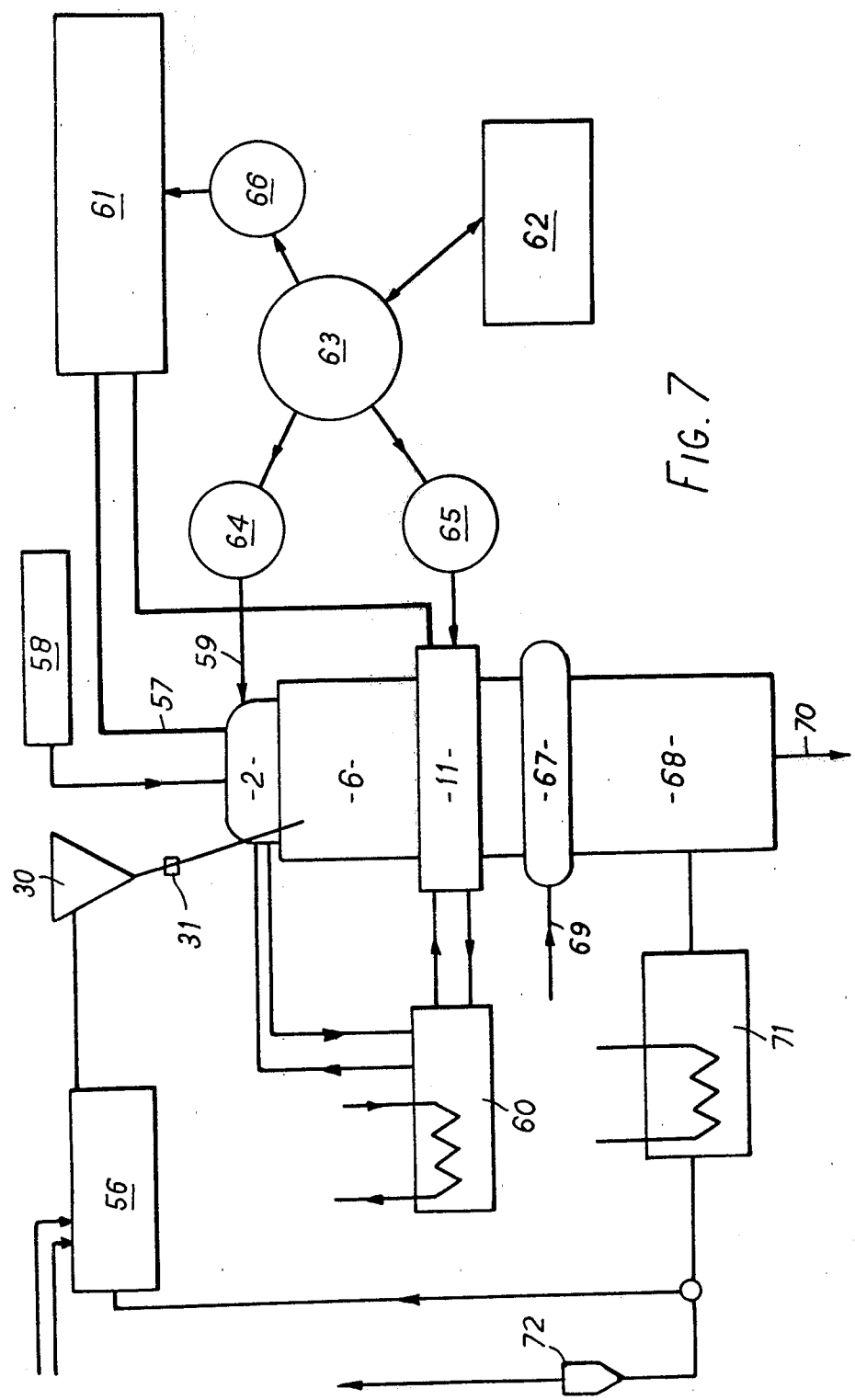
FIG. 7 is a block diagram of an installation incorporating a reactor embodying the invention.

The diagram of FIG. 7 shows the general disposition of the main components of a typical reactor installation. The latter may vary according to specific application. Thus feedstock preparation 56 may involve the grinding and mixing of ore concentrates with a reductant or, in the case of hydraulic cement manufacture, mixing of colliery spoil with limestone additions. The rôle of the feedstock dispenser 30 is to introduce a uniform quantity of feedstocks around the upper portion of the truncated cone formed by the orbiting plasma, while the electrostatic charger 31 may be used where deposition of charges on the feedstock particles is advantageous. The cathode assembly 2 receives its main plasma power supply at 57, a small amount of inert gas 58, such as argon, to form the primary plasma arc, and an auxiliary power supply at 59 to cause the orbiting of the cathode arc attachment. In addition the cathode or cathodes are cooled, usually by high purity deionized water which in turn is cooled in heat exchange with ordinary water in a coolant module 60 provided. The latter also provides cooling for the anode assembly 11. The electrical supplies for the installation comprise main plasma power supplies 61 energizing the arc or arcs between the cathode and anode and auxiliary power supplies 62 providing an independent source for central controls 63, cathode and anode rotor mechanisms 64 and 65 (as described above) and the "pulsator" 66. This device advances or retards the firing angle of the SCR's and accordingly reduces or increases the power to the SCR's in the plasma power supplies. Both the magnitude of the decrease in power and the duration of the decreased power, i.e. the "mark space ratio" can be controlled, thereby producing the required strong discontinuity in the acoustic wave thus formed. Underneath the anode chamber (or anode assembly) 11, in the upper part 67 of the free-fall chamber 68, may be incorporated means for injecting auxiliary gases and/or other substances at 69. This arrangement is utilised, for instance, in order to burn efficiently the carbon and hydrogen contents of colliery spoils during the manufacture of hydraulic cements, or in general when it is desired to change the chemical potential of the arc chamber effluents, or to carry out specific reactions or to lower the temperature of such effluents e.g. by initiating endothermic reactions.

While the non-gaseous products (liquids and solids) emerge at the bottom 70 of the free-fall chamber 68 (where they may undergo further treatment such as quenching and separation), the gaseous exhausts with some entrained fines may be heat exchanged at 71, freed of dust by a cyclone 72, where required, partially or fully used to preheat the feedstocks at 56, prior to being discharged.

FIG. 7 does not show the means for starting the primary arc, which may be carried out by any standard means, such as establishing a pilot arc with the help of a high frequency discharge or other provision of a conducting path, as known in the art.

Figure 8:
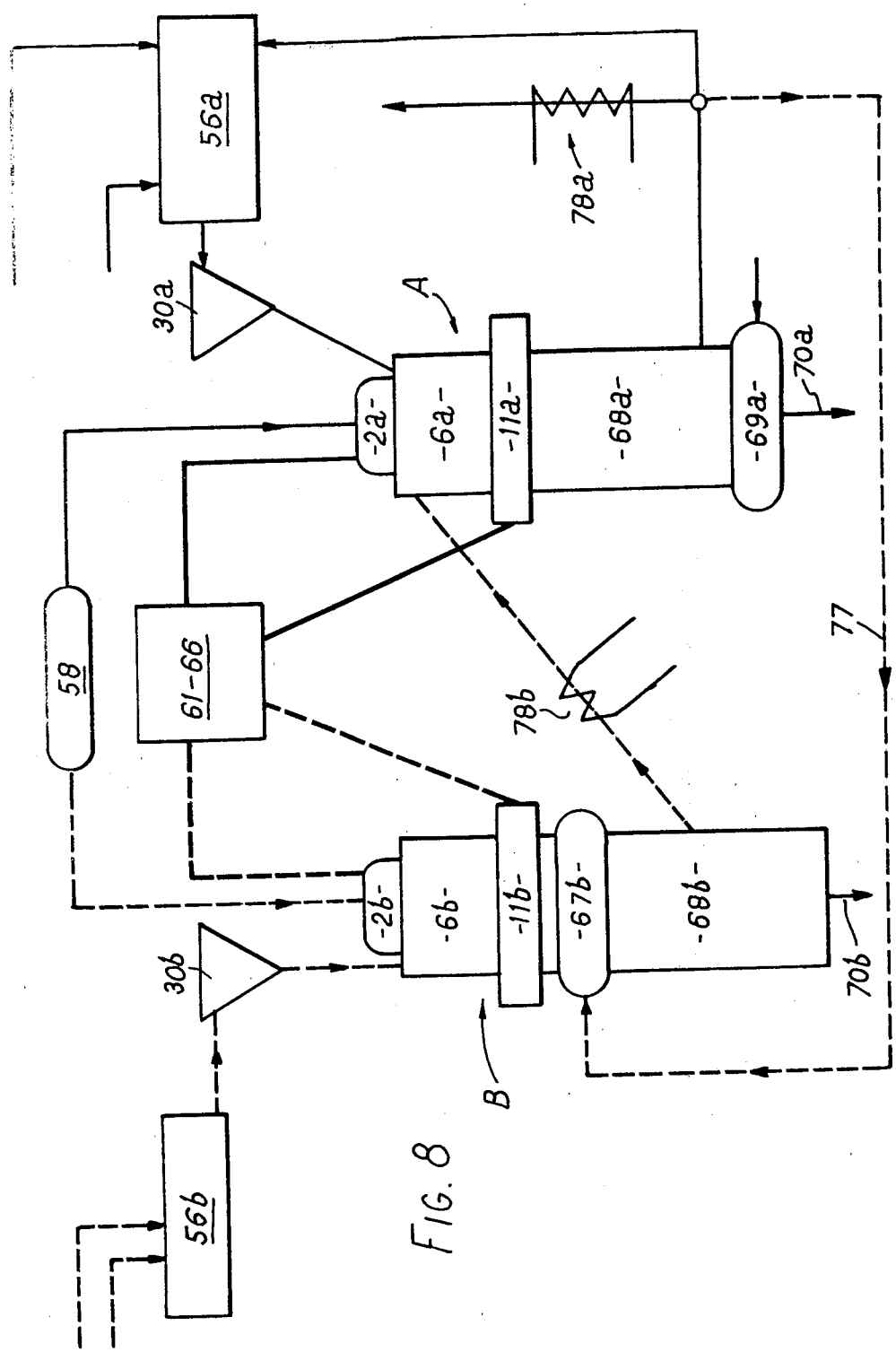
FIG. 8 is a block diagram showing two forms of iron ore reduction plant embodying the invention.

FIG. 8 shows two variants according to which iron ore reduction may be carried out. Similar numerals, with the suffixes a and b, indicate similar parts in two reactors A and B. In the first variant, a single plasma reactor (Reactor A), shown on the right of the Figure, is utilized. Ore concentrate and a reductant such as coal are thoroughly mixed at 56$a$ and dispensed through the dispenser 30$a$ into the arc chamber 6$a$. The feedstocks pass through the arc chamber with the orbiting and pulsating plasma, fall through the anode aperture and the "tail-flame" region immediately beneath it and traverse the "free-fall" chamber 68$a$ at the end of which they may be subjected to a quench at 69$a$. The emerging product at 70$a$ yields a substantially fully metallized granular semisteel product which requires only light crushing and electromagnetic separation from the adhering slag. The carbon content of the resulting semisteel may be adjusted within wide limits by varying the operational parameters. A portion of the exhausts at 76$a$ may be conveniently utilized to preheat the feedstocks directly and recarburize some of the spent gases. In this arrangement the amount of the energy required is relatively higher than in the following, second variant, as the ash content of the coal inevitably increases the overall burden.

According to the second variant, shown also in FIG. 8, both of the reactors A and B are used. Reactor A is supplied only with the ore concentrate, while the reactor B may be supplied with a wide range of carbonaceous wastes and/or low grade fuels, for instance with colliery spoil. The chief rôle of the reactor B is to provide the reactor A with a highly reactive reductant. To this extent, the whole portion on the left of FIG. 8 represents a gasifying plant and may be used in connection with any other "direct reduction" process requiring such reductant facilities. In the reactor B, colliery spoil is dispensed from the dispenser 30$b$ into the orbiting and pulsating plasma where the carbon values are rapidly released from the non-carbonaceous mineral matrix during the residence of the particles in the arc chamber 6$b$ and made to react with partially oxidized exhausts from the reactor A, which are fed through a line 77 to the upper region 67$b$ of the free-fall chamber 68$b$ of the reactor B. The recarburized gases from the reactor B may be suitably cooled in heat exchange at 78$b$ and introduced separately or jointly with the ore concentrates into the reactor A. In this way, the semisteel producing the reactor A is continuously supplied with fully recarburized and highly reactive reductant. This reductant comprises essentially an extremely fine suspension of highly reactive carbon particles in a carbon monoxide gas. Small quantities of unsaturated hydrocarbons, hydrogen, and variety of excited and ionized species are also present. Yet, characteristically, by virtue of the invention this reductant mixture is free from the spoil (gangue) constituents present in large quantities in the feedstock.

It also falls within the scope of this variant of the invention to utilize the solids emerging from the reactor B at 70$b$, as a source of a valuable pozzolanic-type hydraulic cement. For this purpose these solids are oxidized in a blast of hot air to remove the residual carbon content and rapidly quenched. They exhibit excellent pozzolanic properties and may be activated by known techniques to yield a wide range of pozzolanic cements. For the manufacture of cements, limestone can be added to the feedstock preparation at 56b.

The second variant using two plasma reactors "in tandem" (cf. FIG. 8), is also particularly useful where a selective reduction in a complex ore concentrate is required. This type of procedure is well exemplified in treating low grade chromite ores in which the ratio of Cr:Fe is low. Such ores are fairly common—they occur, for instance, in North America and Greenland—but their exploitation was hitherto considered uneconomic. According to this aspect of the invention, such ore concentrates, which when smelted directly lead to very low Cr:Fe ratio, are first passed at a high rate through the reactor A, (which is supplied with reductant by the reactor B), maintaining only a mild reducing potential, which leads to selective reduction of iron. The latter is removed in the usual manner (e.g. grinding and electromagnetic separation) and the residual slag, in which the desired ratio of Cr:Fe can be exactly established, is smelted again, this time under strongly reducing conditions to cause the reduction of the chromite and the residual iron oxide. Conveniently, the latter stage may be carried out using the arrangement shown in FIG. 4.

In the following examples of the practical application of the invention percentages are given by weight.

EXAMPLE 1

Semisteel manufacture in a single reactor.

Taconite ore concentrate containing 95.8% magnetite and 4.2% chiefly silicaceous gangue was used. The feedstock was prepared by taking 60% of the above concentrate, 1.2% limestone and 38.8% coke breeze, mixing them intimately and grinding to minus 300 microns. These feedstocks were gravity fed at a rate of 19 grams per second into the upper portion of the orbiting and pulsating plasma cone of an experimental reactor employing a single stationary plasma torch, supplied with 45 cubic feet per hour of argon, and a segmented anode. It was operated at an average power to the plasma of 184 kW, the pulsator cycling at a maximum power of 200 kW for 16 milliseconds followed by 120 kW for 4 milliseconds in each cycle. The arc of approximately 26 cm length was made to orbit at the anode annulus, by the means shown in FIG. 6, at a speed of 30,000 rpm. The solid products from the reactor required only light grinding and separated easily. The steel fraction was collected electromagnetically and yielded a substantially fully metallised semisteel shot of approximately 0.3% carbon, exhibiting a characteristic dominant alpha ferrite structure with some pearlite. The gaseous exhausts were utilised to preheat the feedstocks.

EXAMPLE 2

Semisteel manufacture using two reactors and colliery spoil from coal preparation plant.

Taconite ore concentrate containing 93.8% magnetite and 6.2% chiefly siliceous gangue was used to manufacture high quality semisteel in a two reactor system as shown in FIG. 8. The feedstock for the reactor A comprised the above ore with 2% addition of limestone and was mixed and comminuted to minus 350 microns. This feedstock was preheated directly with part of the exhaust gases from the reactor B and introduced into the upper portion of the plasma cone in the reactor A at a rate of 134 grams per second. A major portion of the exhaust from the reactor B was also introduced into the plasma chamber of the reactor A. The experimental reactor A employed a gliding cathode type of plasma source as shown in FIG. 2A, supplied with an arc orbiting system as shown in FIG. 5. Both the cathode and anode orbit speeds were maintained at approximately 10,000 rpm, the anode leading the cathode. The average power to the plasma in the reactor A was 116 kW, the pulsator being set to a cycle of 18 milliseconds at 120 kW followed by 2 milliseconds at 80 kW. The reactor B was supplied with bituminous refuse from a coal preparation plant, with the analysis: 23% carbon, 1.1% moisture, 0.9% sulphur, and 67.5% ash. The calorific value of this spoil was approximately 4000 Btu per pound weight. Limestone (8%) was added to the above spoil, and the resulting mixture was ground to minus 250 microns and fed into the reactor B at a rate of 200 grams per second. The average power to the plasma to this reactor was 200 kW. It was supplied with 63 cubic feet per hour of argon and its pulsator was set to a cycle of 12 milliseconds at 230 kW followed by 5 milliseconds at 130 kW. The reactor B had a gliding cathode plasma source as shown in FIG. 2A and an anode as illustrated in FIG. 6. The arc orbiting speed was maintained at 40,000 rpm. The solid products from the reactor A were subjected to a water quench followed by crushing, which readily released the adhering slag from the semisteel granules. These analysed at approximately 0.6% carbon. The gaseous products from the reactor A were mixed with preheated air to achieve combustion and introduced downstream of the free-fall chamber of the reactor B to burn any residual carbon in the emerging solids. Finally, a water quench was applied to these products to yield a granulated pozzolanic product. The above example illustrates considerable savings in electrical energy in the manufacture of high quality semisteel, with simultaneous energy recovery and full utilisation of the carbonaceous wastes.

EXAMPLE 3

Manufacture of highly pozzolanic materials from colliery spoil.

A colliery spoil in the form of coarse bituminous refuse from a coal preparation plant analyzing at: carbon 32.30%, ash 56.40%, sulphur 1.60%, moisture 0.90%, was used in this example to form a highly pozzolanic product, with simultaneous energy recovery. The above spoil showed on further analysis a loss on ignition (LOI) of 43.02% and a calorific value of 5740 Btu per lb. The elemental analysis of the ash as a percentage of the total refuse yielded: Si 14.59%, Al 2.72%, Fe 2.74%, Ti 0.01%, Ca 0.01%, Mg 0.01%, K 0.36%, Na 0.13%.

The above colliery spoil, to which 25% limestone was added, was ground to minus 200 microns and dispensed to a plasma reactor similar to that shown schematically in FIG. 3, at a rate of 280 grams per second. The reactor employed a gliding cathode type of plasma source as shown in FIG. 2A and a segmented anode as shown in FIG. 1, with an arc orbiting system as shown in FIG. 6. The oribiting speed was maintained at 50,000 rpm and the pulsator was set to produce a maximum of 270 kW for 12 milliseconds followed by 4 milliseconds at 200 kW giving an average power to the plasma of 252 kW. After passing through the oribiting plasma cone and the tailflame region immediately below the anode, the particles were subjected to approximately 130% of their stoichiometric requirement of oxygen by injecting preheated compressed air into the upper portion of the free-fall chamber. After traversing the whole length of the free-fall chamber the particles were subjected to a rapid water quench. The dried and milled product exhibited outstanding pozzolanic properties, showing inter alia a fully vitrified structure in the X-ray diffractograms. The Lea Pozzolanicity Test with 40% replacement gave a compressive strength, when cured at 18° C., of 36.4 MN per square meter and 48.2 MN per square meter after 28 days. The gaseous effluents resulting had an average temperature of 1380° C. and could be utilised accordingly. Characteristically, when the high orbiting rate in the above test was reduced to 3000 rpm and the pulsator stopped, the pozzolanicity in the resulting products was markedly impaired.

EXAMPLE 4

Upgrading of chromite ore.

In this example a chromite ore with low Cr:Fe ratio of 0.99 was selectively reduced in a single pass through the plasma reactor to yield a Cr:Fe ratio of 3.5. The chromite ore analysed as $Cr_2O_3$ 34.48%, total Fe 24.14%, $Al_2O_3$ 24.03%, MgO 6.20%, $SiO_2$ 0.81%, $TiO_2$ 0.46%, MnO 0.29%, $V_2O_5$ 0.26%, $K_2O$ 0.15%, $Na_2$ 0.07%, $P_2O_5$ 0.09%. 5.2% of graphite powder was added and the mixture was ground to minus 200 microns and dispensed to a plasma reactor at the same rate and maintaining the same operational parameters as quoted in Example 1. The product was collected, lightly hammer milled and 18.4% of the iron particles which were separated electromagnetically removed. The residual solids were then separately batch smelted in a plasma reactor of type shown in FIG. 4 yielding a Cr:Fe ratio of 3.5 while retaining 5.6% of $Cr_2O_3$ in the slag.

Advantages of the invention include the following.

Reactors according to the invention have a relatively high throughput from a relatively small volume. Thus the capital cost is low, and the invention can be economically applied equally to reactors of relatively low throughput as well as to large units. Because of their relatively small size, reactors according to the invention can be started up within a short time.

The reactors are also economical in materials of construction. They do not require high cost, specialized refractories, because the plasma does not contact the walls of the reactor chamber. Neither does the potentially corrosive feedstock. Thus, it is well known that in glass-making the composition is highly aggressive until reaction is complete, but in reactors according to the invention this reaction takes place entirely within the particles entrained in the plasma. Economies are also made in electrode materials. Thoriated tungsten cathodes are practically non-consumable and are capable of withstanding very high current densities. Anode segments can be advanced radially inwardly to compensate for attrition during operation.

The reactors can be readily constructed in modular form, for example feedstock pretreater, plasma head, reaction chamber, anode section, combustion chamber, cooling chamber, product collector and waste heat boiler. These modules can be removed for servicing and replacement and can also be added to or subtracted from the unit to adapt it to different treatments or products.

The rate of heating and rate of cooling of particles in the reactor are outstandingly high, and this makes possible the performance of processes and achievement of products not practicable before.

The reactor is an essentially simple unit, which can be easily adapted to a variety of processes using different solid feedstocks and gases, whereby a variety of products can be obtained. This multiple utility enables a reactor to be kept in use despite economic changes, because it can be converted as required to produce products for the time being in demand. It can also be used to produce more than one product at a time. For example, by the treatment of ferruginous clays it is possible to obtain both cement and steel products.

I claim:

1. Apparatus for treating particulate matter with low temperature plasma, comprising:
    a pair of stationary electrode structures at least one of which is generally annular, said electrodes being spaced apart to provide a reaction zone;
    means for introducing particulate matter into the reaction zone;
    power supply means applying a pulsating potential difference having a frequency of at least 50 Hz between the electrode structures for establishing and maintaining a discharge therebetween; and
    means for causing circulation of the disposition of the discharge around the peripheries of the or each annular electrode structure.

2. The apparatus of claim 1 wherein the power supply means is adapted to supply substantially direct current fluctuating at a frequency in the range 50 cycles per sec. to 1 kHz.

3. The apparatus of claim 1 comprising a single hollow annular cathode, and a coil associated therewith for causing circulation of the attachment point of said arc.

4. The apparatus of claim 3 wherein the coil is disposed within the annular cathode structure.

5. The apparatus of claim 1 wherein the cathode structure comprises a plurality of separate cathodes spaced round the periphery of the cathode structure and the disposition changing means includes means for controllably varying the energization of the respective cathodes.

6. The apparatus of claim 1 wherein the anode structure comprises spaced segments in an annular array, which are connected for individual controlled energization.

7. The apparatus of claim 6 wherein the segments are each connected to respective thyristors which are activated sequentially.

8. The apparatus of claim 6 wherein electromagnet coils are provided between the anode segments and are connected in pairs to respective phases of a variable frequency polyphase generator.

9. The apparatus of claim 1 wherein the anode is provided in or constituted by the bottom of the reactor.

10. The apparatus of claim 1 wherein the particle introducing means includes means for electrically charging the particles and for feeding the charged particles to the vicinity of the cathode or cathodes.

11. The apparatus of claim 1 including means for introducing further material for reaction downstream from one or both electrode structures.

12. The apparatus of claim 1 wherein means are provided for further treatment of particulate matter after passage through the reaction zone, said means comprising at least one of: quenching means, means for collecting the reaction products, and means for withdrawing the reaction products.

13. The apparatus of claim 1 in combination with a second such apparatus, and including means interconnecting the first and second apparatus for transferring effluent gas from the first apparatus to the second downstream of the anode of the second apparatus and for transferring effluent gas from the second apparatus to the first upstream of the anode of the first apparatus.

14. In apparatus for treating particulate matter with low temperature plasma of the type having spaced electrode structures providing a reaction zone therebetween and means for maintaining expanded plasma within said reaction zone, the improvement wherein said electrode structures comprise stationary structures at least one of which is annular, said expanded plasma maintaining means comprising means applying a discharge establishing and maintaining potential difference between said electrode structures while causing a circulation of the disposition of the discharge around the peripheries of each annular electrode while said potential difference pulsates at a frequency of at least 50 Hz.

15. In apparatus for treating particulate matter with low temperature plasma of the type having spaced electrode structures providing a reaction zone therebetween and means for maintaining expanded plasma within said reaction zone, the improvement wherein said electrode structures comprises stationary structures, said expanded plasma maintaining means comprising means for introducing discontinuities in said plasma.

* * * * *

UNITED STATES PATENT AND TRADEMARK OFFICE
CERTIFICATE OF CORRECTION

PATENT NO. : 4,361,441

DATED : November 30, 1982

INVENTOR(S) : Jozef K. Tylko

It is certified that error appears in the above-identified patent and that said Letters Patent are hereby corrected as shown below:

Column 18, line 49, "43.02%" should be --43.20%--.

Column 22, line 11, "comprises" should be --comprise--.

Column 22, line 14, after "plasma", insert --, including means for establishing a pulsating potential difference between said electrode structures at a frequency of at least 50 Hz--.

Signed and Sealed this

Twelfth Day of April 1983

[SEAL]

Attest:

GERALD J. MOSSINGHOFF

Attesting Officer

Commissioner of Patents and Trademarks